US009179762B2

(12) United States Patent
Paugh et al.

(10) Patent No.: US 9,179,762 B2
(45) Date of Patent: Nov. 10, 2015

(54) PHONE RETRACTOR CARRYING CASE

(71) Applicant: West Coast Chain Mfg. Co., Ontario, CA (US)

(72) Inventors: Boake Paugh, Rancho Cucamonga, CA (US); Joshua R. Buesseler, Seattle, WA (US)

(73) Assignee: West Coast Chain Mfg. Co., Ontario (CA)

( * ) Notice: Subject to any disclaimer, the term of this patent is extended or adjusted under 35 U.S.C. 154(b) by 103 days.

(21) Appl. No.: 13/725,744

(22) Filed: Dec. 21, 2012

(65) Prior Publication Data

US 2014/0175135 A1    Jun. 26, 2014

(51) Int. Cl.
| A45F 5/00 | (2006.01) |
| A45F 5/02 | (2006.01) |
| H04B 1/3827 | (2015.01) |
| H04B 1/3877 | (2015.01) |
| H04M 1/04 | (2006.01) |

(52) U.S. Cl.
CPC .............. *A45F 5/004* (2013.01); *A45F 5/021* (2013.01); *H04B 1/385* (2013.01); *H04B 1/3877* (2013.01); *H04M 1/04* (2013.01); *A45F 2005/008* (2013.01); *A45F 2200/0516* (2013.01); *H04B 2001/3855* (2013.01); *Y10S 224/93* (2013.01)

(58) Field of Classification Search
CPC ............... Y10T 24/45534; Y10T 24/45529; Y10T 24/45581; Y10T 24/45524; Y10T 24/45545; Y10T 24/4555; Y10T 24/45571; Y10T 24/45602; A44B 11/266; A44C 5/2047; A45F 5/004; A45F 2200/0516; A45F 2005/008; H04B 2001/3855; Y10S 224/93
USPC ........... 224/162, 929–930; 24/3.11–3.13, 3.9, 24/615–616, 619–620, 624–625, 594.1, 24/594.11; 455/575.6; 235/462.44; D3/218
See application file for complete search history.

(56) References Cited

U.S. PATENT DOCUMENTS

| 4,688,337 A * | 8/1987 | Dillner et al. ................... 24/616 |
| 5,097,997 A * | 3/1992 | Kipnis et al. .................. 224/269 |
| D359,616 S | 6/1995 | Ishibashi et al. |
| D369,465 S | 5/1996 | Scheid et al. |
| D389,518 S | 1/1998 | Reichmann |
| D389,674 S | 1/1998 | Muller |
| D438,313 S | 2/2001 | Tam |
| 6,263,549 B1 * | 7/2001 | Uehara ........................... 24/625 |
| 6,443,343 B2 * | 9/2002 | Kamiya ........................ 224/269 |
| D495,584 S | 9/2004 | Su |
| D549,709 S | 8/2007 | Richter |
| D550,455 S | 9/2007 | Barnhart |
| D556,681 S | 12/2007 | Kim |
| D556,946 S | 12/2007 | Seum et al. |

(Continued)

*Primary Examiner* — J. Gregory Pickett
*Assistant Examiner* — Scott McNurlen
(74) *Attorney, Agent, or Firm* — Christie, Parker & Hale, LLP

(57) ABSTRACT

An apparatus is provided for detachably tethering a phone to a user's person, such as a belt or strap worn by the user. In one embodiment, the apparatus comprises a case configured to receive the phone, a holster configured to detachably receive the case, a retractable tether having a distal end and a proximal end opposite the distal end, the proximal end connected to the holster, and the distal end detachably connected to the case, wherein a portion of the tether is housed in the holster, the tether configured to move between a retracted position and an extended position, and a spring coupled to the tether, the spring configured to bias the tether into the retracted position.

22 Claims, 13 Drawing Sheets

(56) References Cited

U.S. PATENT DOCUMENTS

| | | | |
|---|---|---|---|
| D566,590 S | 4/2008 | Stevens et al. | |
| D585,677 S | 2/2009 | Zhang | |
| D592,188 S | 5/2009 | Huang | |
| D609,975 S | 2/2010 | Wolhendler | |
| D614,613 S | 4/2010 | Kim et al. | |
| D616,430 S | 5/2010 | Fathollahi | |
| 7,712,644 B2* | 5/2010 | Rafalowitz et al. | 224/482 |
| D621,180 S | 8/2010 | Barabas et al. | |
| D629,193 S | 12/2010 | Liu | |
| D634,947 S | 3/2011 | Barabas et al. | |
| D640,707 S | 6/2011 | Yeh | |
| D641,610 S | 7/2011 | Sedalo | |
| D645,033 S | 9/2011 | Quong et al. | |
| D646,315 S* | 10/2011 | Orf | D16/242 |
| 8,028,794 B1* | 10/2011 | Freeman | 181/202 |
| D650,372 S | 12/2011 | Molter | |
| D650,774 S | 12/2011 | Molter | |
| D651,685 S | 1/2012 | Honzelka | |
| D653,202 S | 1/2012 | Hasbrook et al. | |
| D654,119 S | 2/2012 | Lin | |
| D654,120 S | 2/2012 | Lin | |
| D658,165 S | 4/2012 | Freeman | |
| D661,482 S | 6/2012 | Chang et al. | |
| D661,483 S | 6/2012 | Weller et al. | |
| D661,726 S | 6/2012 | Goble | |
| D669,459 S | 10/2012 | Kim | |
| D669,481 S | 10/2012 | Prescott et al. | |
| D669,890 S | 10/2012 | Hopkins et al. | |
| D674,397 S | 1/2013 | Asher | |
| D676,032 S | 2/2013 | Stump et al. | |
| D676,432 S | 2/2013 | Hasbrook et al. | |
| D683,955 S | 6/2013 | Melanson et al. | |
| D689,852 S | 9/2013 | Azoulay | |
| D691,636 S | 10/2013 | Bunton | |
| 2001/0039200 A1* | 11/2001 | Azima et al. | 455/575 |
| 2005/0011982 A1* | 1/2005 | Salentine et al. | 242/379.2 |
| 2005/0072819 A1* | 4/2005 | Maldonado et al. | 224/162 |
| 2006/0130284 A1* | 6/2006 | Shellnutt | 24/3.12 |
| 2007/0278265 A1* | 12/2007 | Contente | 224/162 |
| 2009/0084697 A1* | 4/2009 | Gross | 206/316.1 |
| 2009/0193632 A1* | 8/2009 | Yeh | 24/581.1 |
| 2010/0171021 A1* | 7/2010 | Smith | 248/558 |
| 2010/0206976 A1* | 8/2010 | Salentine et al. | 242/379.2 |
| 2011/0073608 A1* | 3/2011 | Richardson et al. | 220/737 |
| 2011/0233078 A1* | 9/2011 | Monaco et al. | 206/223 |
| 2012/0170212 A1 | 7/2012 | Gallouzi et al. | |

* cited by examiner

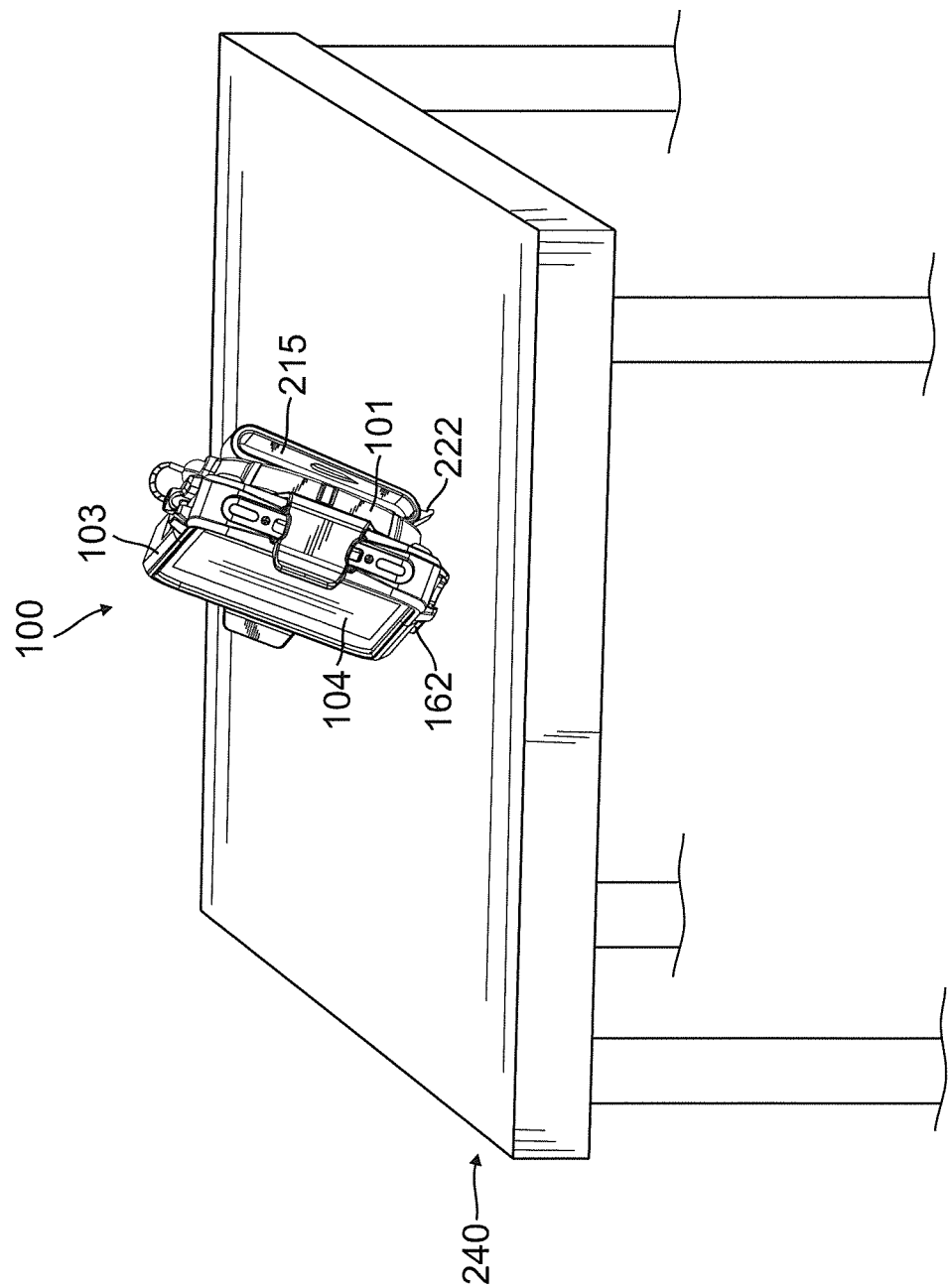

PHONE RETRACTOR CARRYING CASE

TECHNICAL FIELD

This application relates generally to a device for protecting a phone, and more particularly to a phone carrying case detachably tethered to a belt holster.

BACKGROUND OF THE INVENTION

Users commonly carry their phones on their belt or on the outside of other articles of clothing worn by the user for convenient and quick access to the phone. Additionally, carrying a cell phone on the outside of the user's person may make the phone readily accessible during particular activities, such as mountain biking, during which the user cannot divert his focus to retrieve a phone in the user's pocket or bag. However, carrying a phone on the outside of the user's person presents the risk that the phone may become damaged if it is inadvertently dislodged from the user's person and falls to the ground. Typically, phones configured to be worn on the user's person may be tethered to the user's person to mitigate the risk of damage to the phone. Conventional apparatuses for tethering a phone to a user may include adhering or otherwise permanently attaching the phone to a tether. However, such conventional tethers limit the versatility of the phone because the user is unable to use the phone independently of the tether.

Other conventional apparatuses include a phone case and a tether which are configured to separately connect to the user's belt or other article of clothing. However, such conventional apparatuses may be cumbersome or inconvenient to use because they require multiple connections to the user's person. Additionally, such apparatuses may appear unsightly.

Accordingly, it is desirable that an apparatus for carrying a phone include a quick-release connector for detaching the phone from a tether. Moreover, it is desirable to provide a compact apparatus for carrying a phone which includes a case configured to detachably connect to a holster housing a retractor mechanism.

SUMMARY OF THE INVENTION

The present invention is directed to an apparatus for securing a phone to an article on a person, such as a belt. In one embodiment, the apparatus comprises a case configured to receive the phone, a holster configured to detachably receive the case, a retractable tether having a distal end and a proximal end opposite the distal end, the proximal end connected to the holster, and the distal end detachably connected to the case, wherein a portion of the tether is housed in the holster, the tether configured to move between a retracted position and an extended position, and a spring coupled to the tether, the spring configured to bias the tether into the retracted position. In one embodiment, the case comprises a first housing and a second housing slidably engageable with the first housing. In another embodiment, one of the first and second housings includes a catch configured to engage a latch on the other housing. In yet another embodiment, one of the first and second housings includes a tongue configured to slidably engage a groove on the other housing. In one embodiment, the apparatus further comprises a clip connected to the holster, the clip configured to attach the apparatus to a belt worn by a user.

In one embodiment, the apparatus comprises a quick-release connector attached to the distal end of the tether, such as by a knot formed in the distal end of the tether engaging a hole formed in the quick-release connector. In another embodiment, the case comprises at least one receptacle for receiving the quick-release connector. In one embodiment, the quick-release connector further comprises teeth configured to engage notches in the receptacle. In another embodiment, the apparatus comprises a stop connected to the tether at a first length from the distal end of the tether such that the length of the tether is slack when the case is attached to the holster. In yet another embodiment, the apparatus comprises a spool rotatably housed within the holster, wherein a portion of the tether is wound around the spool. In a further embodiment, the holster further comprises opposing first and second aims extending in a first direction, the arms configured to engage a portion of the case, and opposing first and second fingers extending in a second direction, the fingers configured to laterally support the case. In one embodiment, the first direction is generally orthogonal to the second direction. In another embodiment, a rear surface of the case further comprises a plurality of feet configured to support the case on a level surface.

In one embodiment, an apparatus is provided for securing a phone to a user's wrist. In one embodiment, the apparatus includes a case configured to receive the phone, a quick-release connector configured to detachably connect to the case, and a wrist strap connected to the quick-release connector. In another embodiment, the case comprises a first housing and a second housing slidably engageable with the first housing, the first and second housings cooperating to receive the phone.

BRIEF DESCRIPTION OF THE DRAWINGS

Embodiments of a phone retractor carrying case are described with reference to the following figures. The same reference numerals are used throughout the figures to reference like features, components, and method steps.

FIG. 7 is a perspective view of the phone retractor device of FIGS. 2A and 2B shown in an inclined position on a table;

DETAILED DESCRIPTION

Figure 1A:
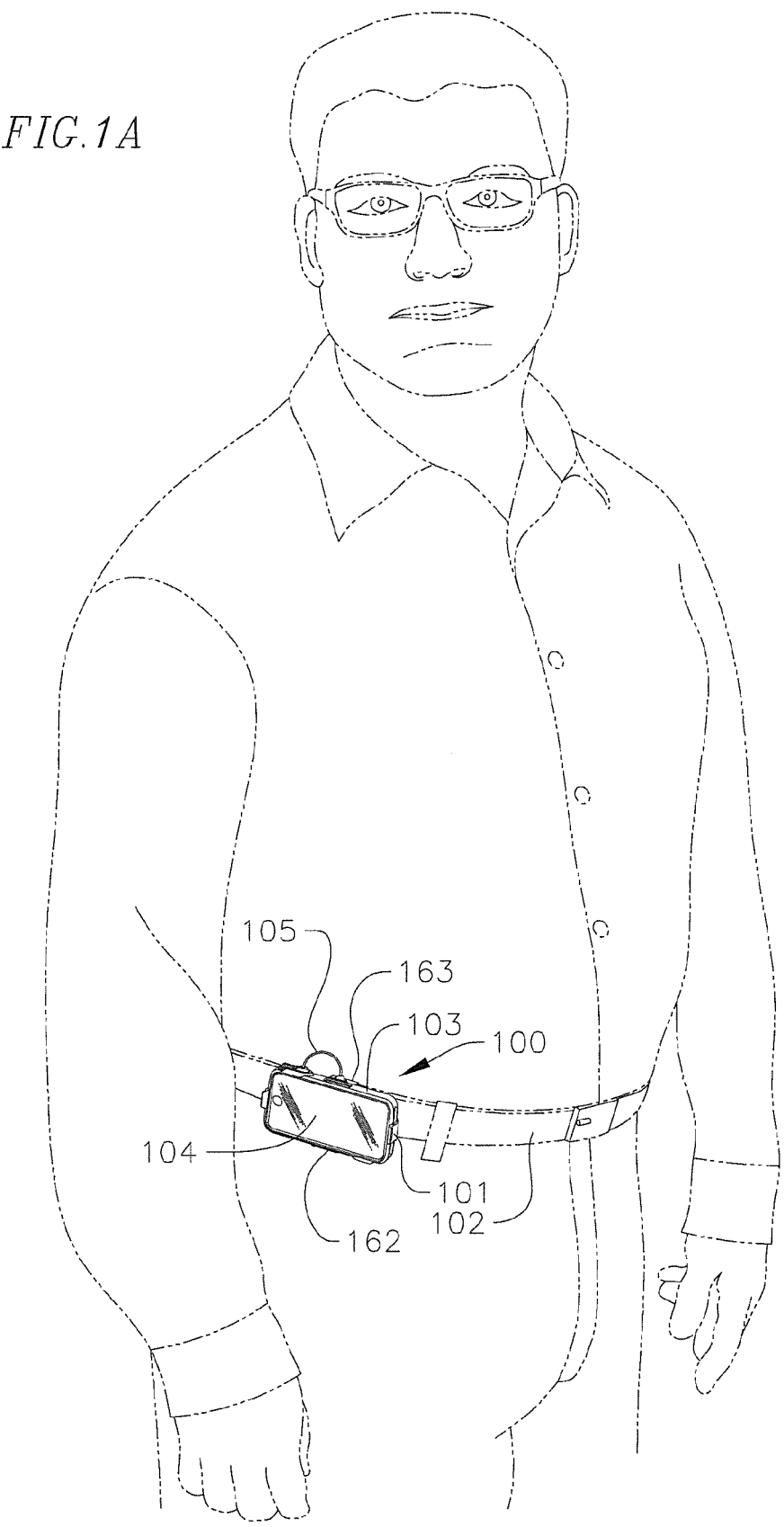
FIGS. 1A and 1B are perspective views of a phone retractor device according to an embodiment of the present invention attached to a user's belt and extended from the user's belt, respectively.
Figure 1B:
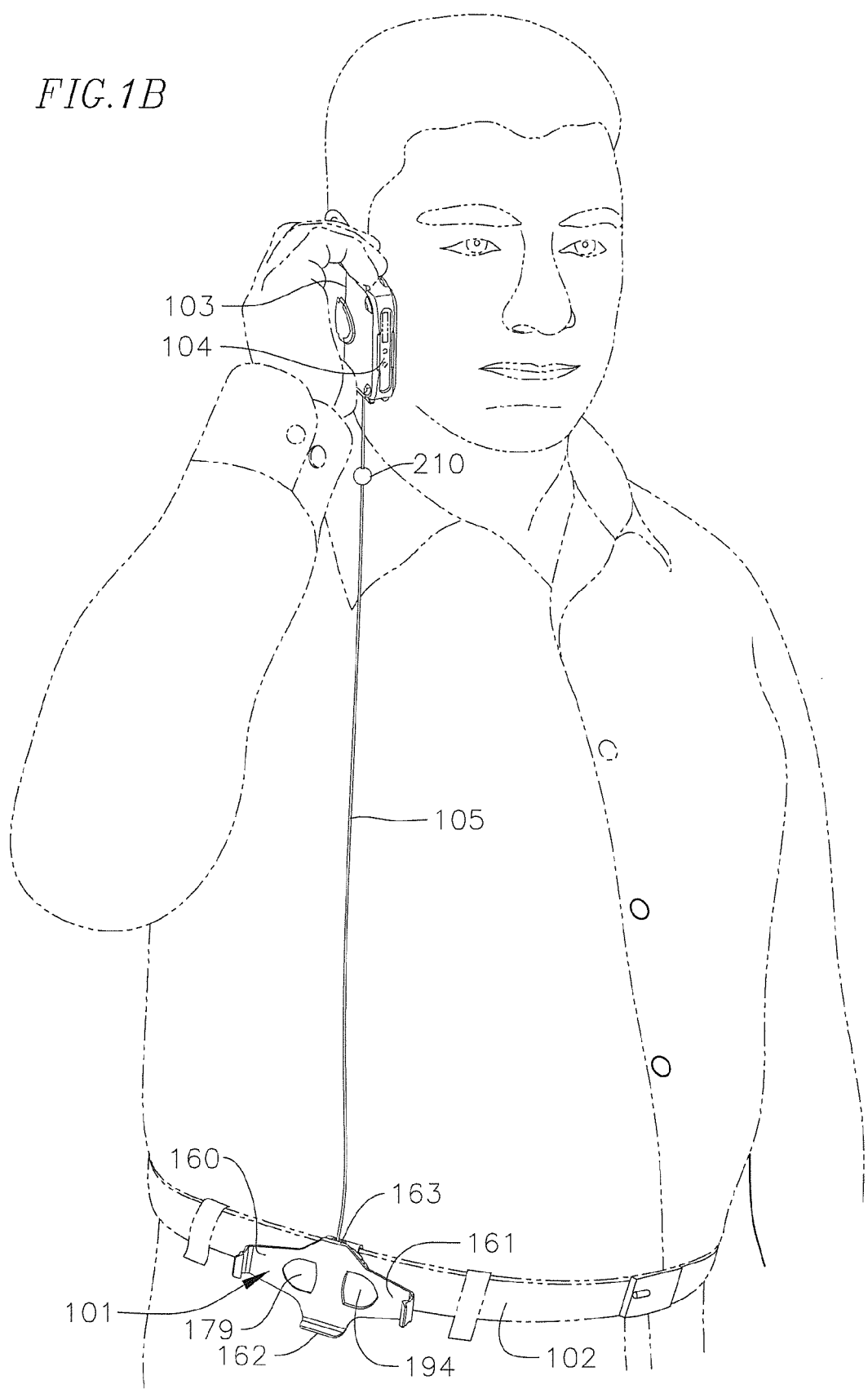
Figure 2A:
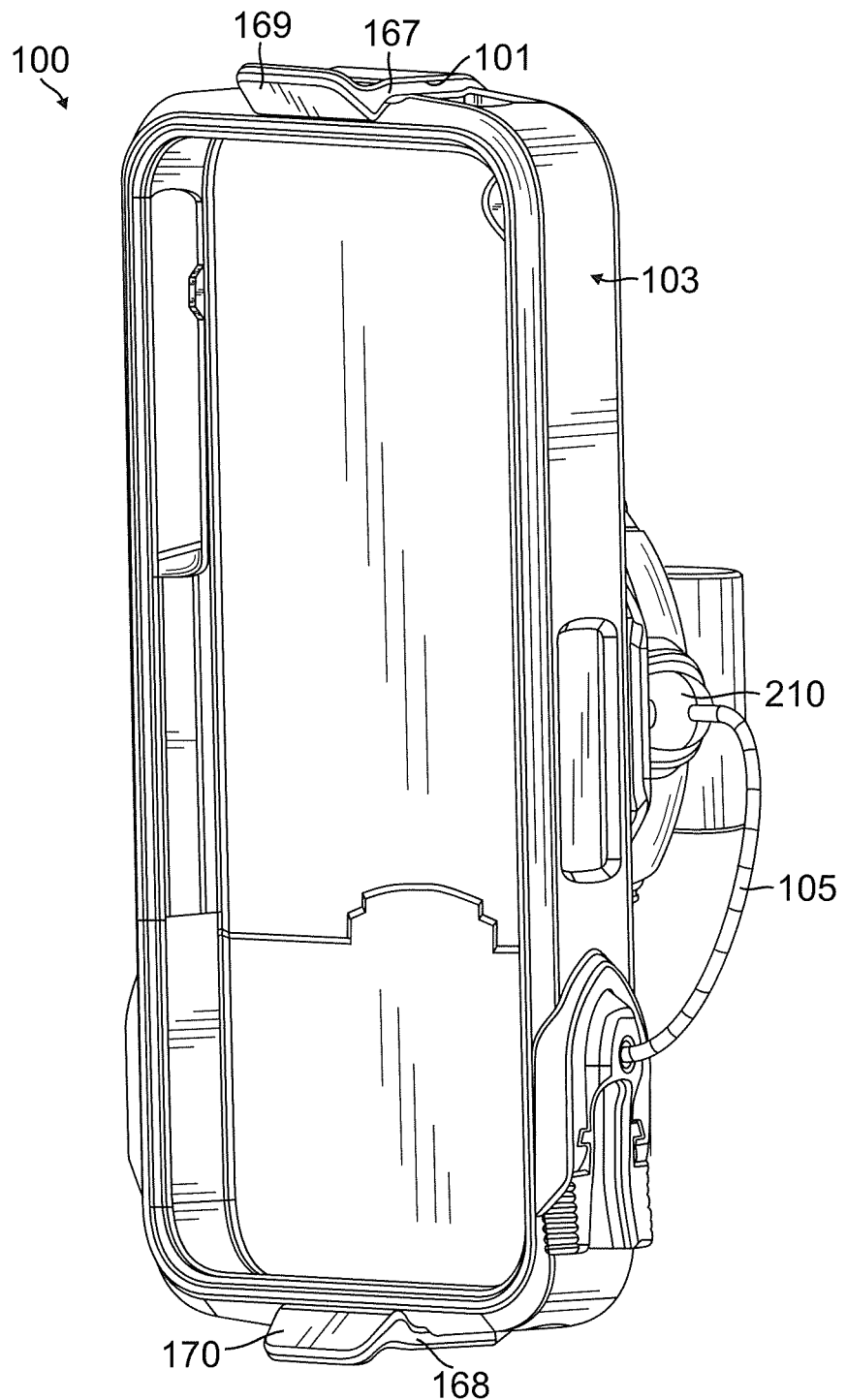
FIGS. 2A and 2B are front and rear perspective views, respectively, of an embodiment of the phone retractor device.
Figure 2B:
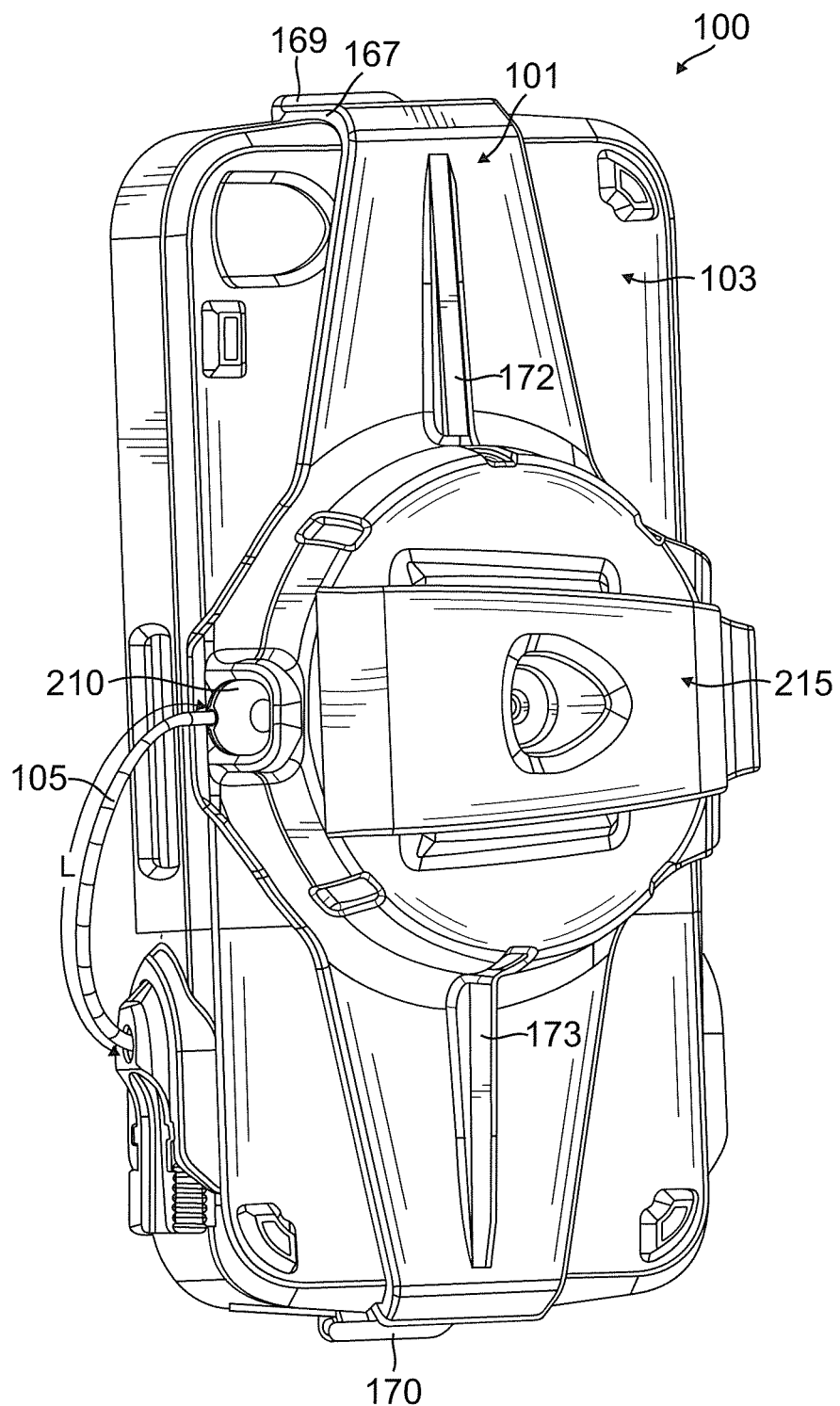

The present invention relates to a phone retractor device for protecting a cellular phone, and more particularly a phone carrying case detachably tethered to a holster that can be carried on a person's body, such as a belt or strap worn by the user. In an embodiment of the present invention illustrated in FIGS. 1A and 1B, a phone retractor device 100 comprising a holster 101 configured to be secured to the user's belt or strap 102 and a case 103 configured to house a cellular phone 104 and detachably connect to the holster 101 with a retractable tether 105 is provided. The phone retractor device 100 of the present invention is configured to allow the user to secure the phone 104 to the holster 101 when not in use, and to detach the phone 104 from the holster 101 to operate the phone 104. When the carrying case 103 is detached from the holster 101, the retractable tether 105 extends from the holster 101 such that the user can extend the phone 104 up to the user's head while the holster 101 remains attached to the user's belt 102, as illustrated in FIG. 1B. In this manner, the case 103 and phone 104 remain secured to the holster 101 by the retractable tether 105 even when the case 103 and phone 104 are detached from the holster 101 and extended up to the user's face. Additionally, a biasing force supplied by the retractable tether 105 is configured to prevent the phone 104 from contacting the ground if the user inadvertently drops the phone 104. When the carrying case 103 and phone 104 are attached to the holster 101 (see FIG. 1A), a portion of the retractable tether 105 is retracted within the holster 101 to reduce the likelihood that the tether 105 will inadvertently catch on a foreign object or another article of clothing worn by the user. Additionally, the retractable tether 105 may be detached from the phone carrying case 103 such that the phone 104 can be used independently of the tether 105 and the holster 101, such as when the user is engaged in an activity less likely to cause the user to drop and damage the phone 104. Moreover, the phone retractor device 100 is configured to be worn on either the user's left or right side to provide ergonomic and convenient use of the phone 104 by both right- and left-handed users. In one embodiment, the phone retractor device 100 is configured to secure the user's phone 104 in a horizontal configuration along the user's belt or strap 102, as illustrated in FIG. 1A (i.e., the lengthwise direction of the phone 104 is oriented horizontally along the user's belt 102). It will be appreciated, however, that the phone 104 may be secured to the user's person in a different orientation (e.g., vertical) and still fall within the scope and spirit of the present invention. A phone retractor device 100 according to an embodiment of the present invention having a phone carrying case 103 detachably connected to a holster 101 with a retractable tether 105 is illustrated in FIGS. 2A and 2B.

Figures 3A, 3B:
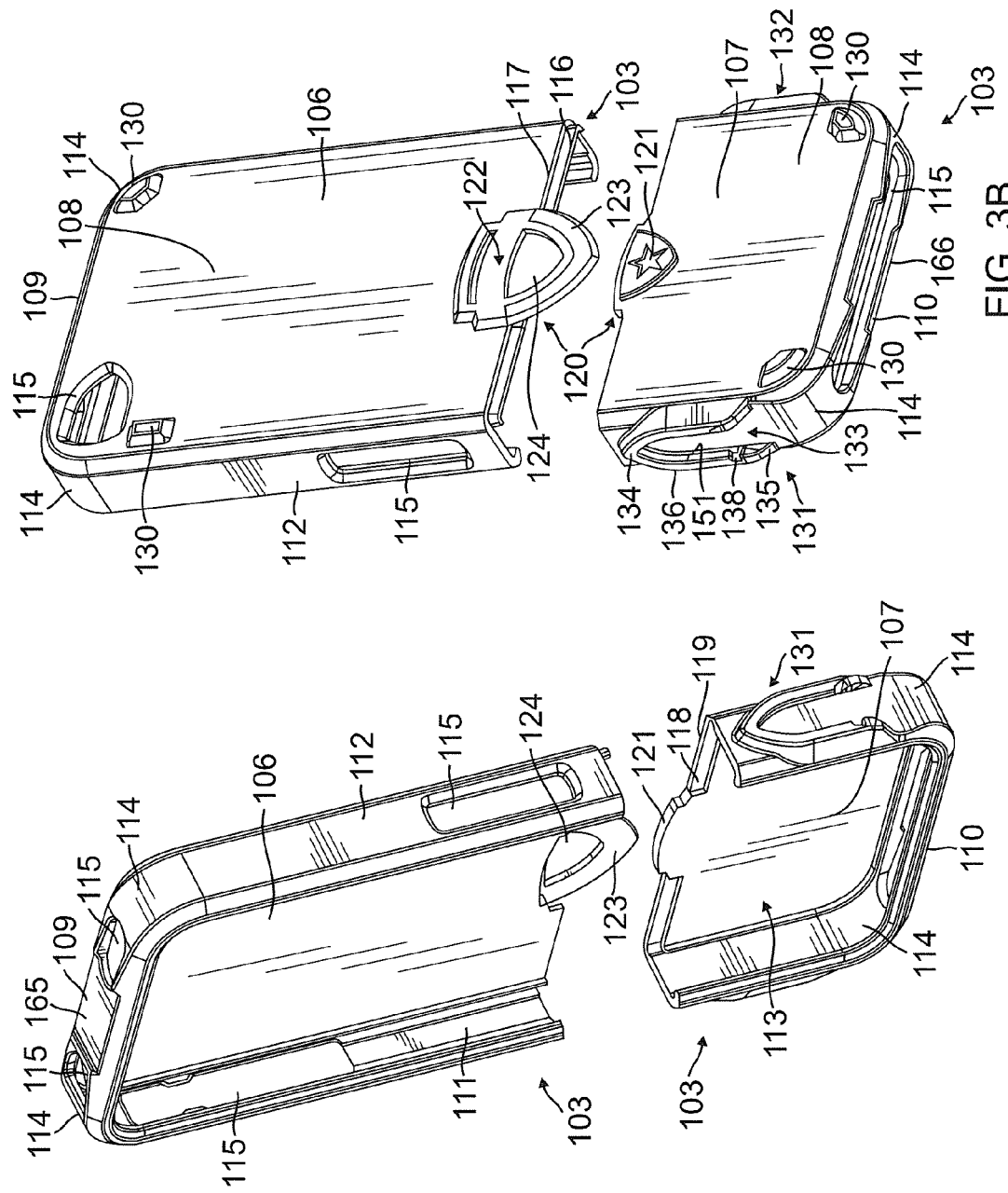
FIGS. 3A and 3B are front and rear perspective views, respectively, of an embodiment of the case in a detached position.

With reference now to the embodiment illustrated in FIGS. 3A and 3B, the case 103 comprises an upper housing 106 detachably connectable to a lower housing 107. The upper and lower housings 106, 107 are configured to detach to receive the phone 104 and then reattach to secure the phone 104 inside the case 103 (see FIG. 1A). It will also be appreciated that the phone 104 may be removed from the case 103 by detaching the upper and lower housings 106, 107 from each other, as described below. In the illustrated embodiment, the upper housing 106 is approximately ⅔ of the size of the case 103 and the lower housing 107 is approximately ⅓ of the size of the case 103. It is understood that the relative sizes between the upper and lower housings 106, 107, respectively, may be varied as desired and appropriate. For example, the upper and lower housing 106, 107 may each be approximately ½ of the size of the case 103 or the upper housing 106 may be ⅓ of the size of the case 103 and the lower housing 107 may be ⅔ of the size of the case 103.

Together, the upper and lower housings 106, 107 include a back wall portion 108, and opposing upper and lower wall portions 109, 110 and opposing lateral wall portions 111, 112 extending forward from the back wall portion 108. Moreover, the wall portions 109, 110, 111, and 112 and the back wall portion 108 form a cavity 113 for receiving the phone 104. In the illustrated embodiment, the back wall portion 108 is generally rectangular and the wall portions 109, 110, 111, and 112 extend around the periphery of the back wall portion 108 such that the lateral wall portions 111, 112 are generally orthogonal to the upper and lower wall portions 109, 110. The walls portions 109, 110, 111, and 112 are configured to generally conform to the periphery of the phone 104 housed in the case 103 to thereby secure and protect the phone 104 in the cavity 113 of the case 103. Additionally, the case 103 may include rounded corners 114 configured to accommodate the shape of the phone 104. In the illustrated embodiment of FIGS. 3A and 3B, the wall portions 109, 110, 111, and 112 and the back wall portion 108 also include a plurality of openings or apertures 115 configured to expose and allow access to a variety of components on a typical cellular phone 104, such as auxiliary ports, headphone ports, power buttons, volume controls, SIM card slots, memory card slots, and a camera lens and flash. It will be appreciated that the case 103 of the present invention can be configured to accommodate the specific arrangement of components on any cellular phone.

With continued reference to the embodiment illustrated in FIGS. 3A and 3B, the upper housing 106 is slidably engageable with the lower housing 107 (i.e., the upper and lower housings 106, 107 are configured to slide together to secure the phone in the interior cavity 113 of the case 103). In one embodiment, the upper housing 106 includes a tongue 116 (FIG. 3B) projecting from a lower edge 117 of the upper housing 106 configured to be received in a corresponding groove 118 (FIG. 3A) along an upper edge 119 of the lower housing 107. Accordingly, when the upper and lower housings 106, 107 are attached together, the tongue 116 underlaps a portion of the lower housing 107. This interlocking tongue-and-groove joint is configured to ensure proper alignment between the upper and lower housings 106, 107 when they are attached together. In the illustrated embodiment, both the tongue 116 and the groove 118 extend along the back wall 108 of the case 103 between the lateral wall portions 111, 112. In an alternate embodiment, the tongue and groove 116, 118, respectively, may also extend forward along all or a portion of the walls 111, 112 of the case 103.

With continued reference to FIGS. 3A and 3B, the case also includes a locking mechanism 120 for securing the upper and lower housings 106, 107 together in the attached position. In the illustrated embodiment, the locking mechanism 120 comprises a catch 121 disposed on the upper end of the lower housing 107 engageable with a latch 122 disposed on the lower end of the upper housing 106. The latch 122 includes a generally U-shaped flange 123 extending below the lower edge 117 of the upper housing 106 defining an opening 124 configured to receive the catch 121. The catch 121 is a boss projecting rearward from the back wall portion 108 of the case 103. The shape of the catch 121 generally complements the shape of the opening 124 in the latch 122. In the illustrated embodiment, the catch 121 and the opening 124 are generally triangular and have wider upper portions which taper to narrower lower portions. It will be appreciated that the shapes of the catch 121 and the opening 124 in the latch 122 are configured to ensure proper alignment between the upper and lower housings 106, 107 because there is preferably only one suitable orientation in which the catch 121 may be received in the opening 124. Additionally, the shapes of the catch 121 and the opening 124 in the illustrated embodiment are configured to prevent rotation of the catch 121 within the opening 124 which further tends to secure the upper and lower housings 106, 107 together. Although the catch 121 and corresponding opening 124 in the latch 122 in the illustrated embodiment are generally triangular, the catch 121 and opening 124 may have any other suitable shapes, such as circular, ovaloid, or square, and still fall within the scope and spirit of the present invention. In an alternate embodiment, the catch 121 may be provided on the upper housing 106 and the latch 122 may be provided on the lower housing 107.

To connect the upper and lower housings 106, 107, the user depresses the catch 121 inward (i.e., into the cavity 113) and slides the upper and lower housings 106, 107 together along the tongue 116 and groove 118. Depressing the catch 121 enables the catch 121 the pass above the flange 123 and into the opening 124. After the depressed catch 121 passes above the flange 123, the user may release the catch 121 causing the restorative force supplied by the elastically deflected catch 121 to return the catch 121 to its original position. In this manner, the catch 121 extends up into the opening 124 in the latch 122. When the catch 121 is received in the opening 124, the flange 123 engages the periphery of the catch 121, which tends to prevent the catch 121 from inadvertently disengaging the latch 122. Additionally, when the upper and lower housings 106, 107 are attached, the tongue portion 116 of the upper housing 106 underlaps a portion of the lower housing 107 and the flange portion 123 of the upper housing 107 overlaps a portion of the lower housing 106. This interlocking configuration secures the upper and lower housings 106, 107 together in the attached position (see FIGS. 2A and 2B). To separate the upper and lower housings 106, 107, the user again depresses the catch 121 on the lower housing 107 such that the catch 121 can pass below the flange 123, and then slides apart the upper and lower housings 106, 107. In an alternate embodiment, the upper and lower housings 106, 107 may be locked together in the attached position by any other suitable means, such as hook-and-loop type fasteners or with a press-fit connection. As described above, the upper and lower housings 106, 107 are configured to slide apart for insertion or removal of the phone 104 from the cavity 113 of the case 103, and the upper and lower housings 106, 107 are configured to lock together to secure the phone 104 in the case 103.

In the illustrated embodiment of 3A and 3B, the case 103 also includes a plurality of projections or feet 130 configured to provide level support for the case 103, for instance, when the case 103 is detached from the retractable tether 105 and placed on a flat surface such as a table or desk. In the illustrated embodiment, the feet 130 are bosses projecting rearward from the back wall 108 of the case 103. In one embodiment, the upper housing 106 includes two feet 130 located near the corners 114 of the upper housing 106 and the lower housing 107 includes two feet 130 located near the corners 114 of the lower housing 107. It will be appreciated, however, that the present invention is not limited to the number of feet 130 recited above, and that the case 103 may include any desired number of feet (e.g., between three and ten) to support the case 103. In one embodiment, the height of the feet 130 is not less than the height of the latch 122 and catch 121. Otherwise, the case 103 would tend to balance precariously on the latch 122 and catch 121, rather than being evenly and stably supported by the feet 130. The feet may be any suitable shape, such as cuboid, rhomboid, ovoid, or irregularly shaped.

With continued reference to FIGS. 3A and 3B, the lower housing 107 includes opposing receptacles 131, 132 for detachably securing the retractable tether 105 (see FIGS. 2A and 2B) to the case 103. That is, the receptacles 131, 132 are configured to detachably tether the phone case 103 to the holster 101. A proximal end of the tether 105 is connected to the holster 101 and a distal end of the tether 105 is configured to attach to the case 103, as illustrated in FIG. 1B. The distal end of the tether 105 is configured to detach from the case 103 such that the case 103 can be used independently of the holster 101. The user may selectively attach the retractable tether 105 to one of the two receptacles 131, 132 depending upon the position of the phone on the user's belt or strap 102, the significance of which is explained below.

When the phone retractor device 100 is attached to a user's belt (see FIG. 1A), it is convenient to orient the phone 104 such that the ear speaker is closer to the front of the user's body and the phone microphone is closer to the rear of the user's body. This orientation allows the user to conveniently raise the phone 104 to the user's face such that the ear speaker and microphone of the phone are aligned with the user's ear and mouth, respectively, as illustrated in FIG. 1B, without the need for additional manipulation (e.g., rotation) of the phone 104. It will be appreciated, however, that maintaining this orientation requires the user to flip the phone 104 depending upon which side of the user's body the phone retractor device 100 is attached. For instance, when the phone retractor device 100 is attached to the right side of the user's body, lateral sidewall 112 faces upward, whereas opposing lateral sidewall 112 faces upward when the phone retractor device 100 is attached to the user's left side, as illustrated in FIG. 1A. Moreover, it is convenient for the tether 105 to connect to the side of the case 103 which corresponds to the side of the holster 101 from which the tether 105 extends. For instance, in the illustrated embodiment of FIG. 1A, the tether 105 extends out of the upper end of the holster 101 and connects to the sidewall 112 of the case 103 facing upward. Otherwise, the tether 105 may become tangled around the holster 101. Accordingly, providing opposing receptacles 131, 132 on the case 103 enables the user to detachably connect the retractable tether 105 to one of the receptacles 131, 132 when the phone retractor device 100 is attached to one side of the user's body and detachably connect the retractable tether 105 to the other receptacle 131, 132 when the phone retractor device 100 is attached to the other side of the user's body. In this manner, the retractable tether 105 may be connected to the side of the case 103 facing upward regardless of the side of the user's belt on which the phone retractor case 100 is attached. Accordingly, the receptacles 131, 132 are provided on opposite sides of the case 103 such that the phone 104 can be attached on either the user's left- or right-hand side in a convenient orientation. It will be appreciated, however, that the case 103 may be provided with a single receptacle and still fall within the scope and spirit of the present invention.

Figure 3D:
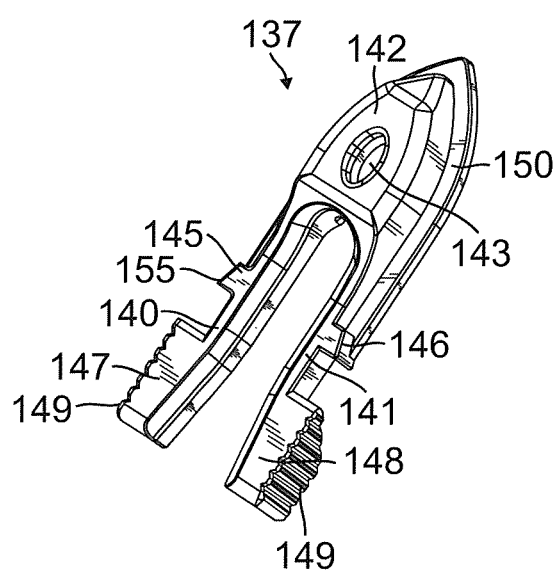
FIG. 3D is an enlarged perspective view of the quick-release connector illustrated in FIG. 3C.
Figure 3C:
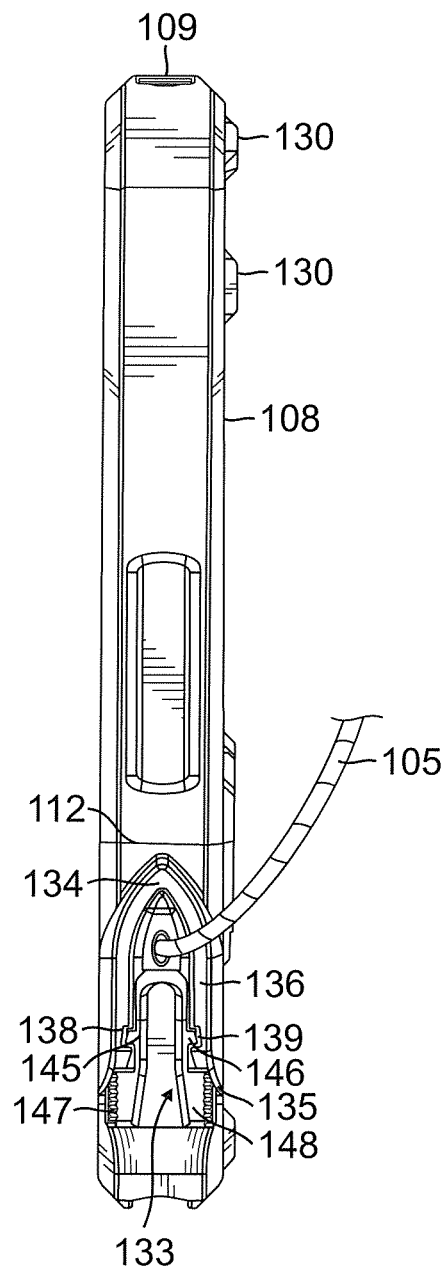
FIG. 3C is a side view of a quick-release connector received in a receptacle of a case according to an embodiment of the present invention.

As illustrated in the embodiment of FIGS. 3A and 3B, each of the receptacles 131, 132 comprise a tapered channel 133 having a closed end 134 and an open end 135 opposite the closed end 134 (i.e., the tapered channel 133 opens downward). The tapered channels 133 are defined by inverted U-shaped flanges 136 extending outward from the opposing lateral sidewalls 111, 112, respectively. The receptacles 131, 132 are configured to receive a quick-release connector 137, described in detail below, attached to the distal end of the retractable tether 105. The quick-release connector 137 is configured to be inserted through the open end 135 of the receptacle and into the tapered channel 133, as illustrated in FIG. 3C. Accordingly, when the quick-release connector 137 is connected to one of the receptacles 131, 132 in the case 103, the case 103 and phone 104 are connected to the holster 101 by the retractable tether 105, and when the quick-release connector 137 is detached from the receptacles 131, 132, the case 103 is no longer tethered to the holster 101 such that the user can use the phone 104 independently of the holster 101. The receptacles 131, 132 also comprise opposing notches 138, 139 in the inverted U-shaped flange 136 which are configured to prevent the quick-release connector 137 from inadvertently disengaging the receptacle 131, 132.

With reference now to FIG. 3C, the quick-release connector 137 is shown connected to the receptacle 131 in the case 103 such that the distal end of the tether 105 is attached to the case 103. In the illustrated embodiment of FIG. 3D, the quick-release connector 137 has a wishbone shape comprising opposing legs 140, 141 which diverge from a junction (e.g., a head) 142. The shape of the quick-release connector 137 generally complements the shape of the tapered channels 133 in the receptacles 131, 132. The junction (e.g., the head) 142 of the quick-release connector 137 includes an opening 143 (e.g., an ovaloid through hole) for receiving the distal end of the retractable tether 105 (see FIGS. 2A, 2B, and 3C). The tether 105 may be secured to the quick-release connector 137 by any suitable means, such as bonding. In one embodiment, the distal end of the retractable tether 105 is inserted through the opening 143 in the quick-release connector 137 and then a knot is formed in the distal end of the tether 105 to secure the tether 105 to the quick-release connector 137. The opposing legs 140, 141 of the connector 137 include outwardly extending teeth 145, 146 configured to engage the notches 138, 139, respectively, in the receptacles 131, 132. When the quick-release connector 137 is received in one of the receptacles 131, 132, a lower end of the legs 140, 141 extends below the open end 135 of the receptacle 131, 132. Exposing the lower end of the legs 140, 141 aids the user in detaching the quick-release connector 137 from the case 103, as described below. Moreover, the lower ends of the legs 140, 141 include outwardly protecting tabs 147, 148. In the illustrated embodiment, outer surfaces of the tabs 147, 148 include friction-inducing surface features 149, such as a knurled surface, striations, etching, grooves, ridges, or a coating, which are configured to prevent the user's fingers from inadvertently disengaging the quick-release connector 137 when the user is attaching and detaching the quick-release connector 137 to the case 103. The quick-release connector 137 also includes a flange 150 extending around the periphery of the connector 137 which is configured to slidably engage a groove 151 (see FIG. 3B) in the receptacle 131, 132. When the flange 150 is engaged with the groove 151, a portion of the inverted U-shaped flange 136 overhangs the flange portion 150 of the quick-release connector 137 in a tongue and groove type joint. This overlapping configuration tends to retain the quick-release 137 in the appropriate receptacle 131, 132. The groove 151 is also configured to guide the quick-release connector 137 into and out of the tapered channel 133 of the appropriate receptacle 131, 132.

To detachably connect the tether 105 to the case 103, the user grasps the tabs 147, 148 and slides the quick-release connector 137 into the tapered channel 133 in the appropriate receptacle 131, 132, depending upon the orientation of the phone retractor case 100 on the user's belt 102, described above. As the quick-release connector 137 is slid through the open end 135 of the appropriate receptacle 131, 132 and into the tapered channel 133, the legs 140, 141 are elastically compressed toward each other as the teeth 145, 146 slide along the inverted U-shaped flange 136. The user continues to slide the quick-release connector 137 toward the closed end 134 of the appropriate receptacle 131, 132 until the teeth 145, 146 are aligned with the notches 138, 139. Once the teeth 145, 146 are aligned with the notches 138, 139, the user releases the tabs 147, 148 and the restorative force supplied by the elastically compressed legs 140, 141 causes the legs 140, 141 to expand away from each other until the teeth 145, 146 are seated in the notches 138, 139. In the illustrated embodiment of FIG. 3D, both of the teeth 145, 146 also include a chamfered edge 155 configured to enable the quick-release connector 137 to slide into the appropriate receptacle 131, 132 and prevent the quick-release connector 137 from inadvertently disengaging the notches 138, 139 (i.e., the teeth are chamfered such that leading edges of the teeth are narrower than relatively wider trailing edges of the teeth). To detach the quick-release connector 137 from the case 103, the user compresses the legs 140, 141 toward each other by depressing the tabs 147, 148, causing the teeth 145, 146 to disengage the notches 138, 139 in the appropriate receptacle 131, 132. With the teeth 145, 146 disengaged from the notches 138, 139, the user may then draw the quick-release connector 137 out of the open end 135 of the tapered channel, thereby detaching the tether 105 from the case 103.

Although the case 103 has been described above with reference to upper and lower housings 106, 107, in an alternate embodiment the case 103 may be formed from a single unitary piece. The case 103 may comprise any suitably durable material, such as aluminum, plastic, or silicone. Additionally, the case 103 may be formed from any suitable means, machining, welding (e.g., ultrasonic welding or friction stir welding), liquid injection molding, or rapid prototyping using additive manufacturing (e.g., laser sintering or stereolithography). In the embodiment in which the case 103 is formed from a single piece, forming the case from a malleable material, such as silicone, may facilitate insertion of the phone 104 into the case 103. Additionally, although the case 103 has been described above as configured to carry a cellular phone 104, the case 103 may also be configured to carry other electronic devices, such as portable music players and cameras.

Figures 4A, 4B:
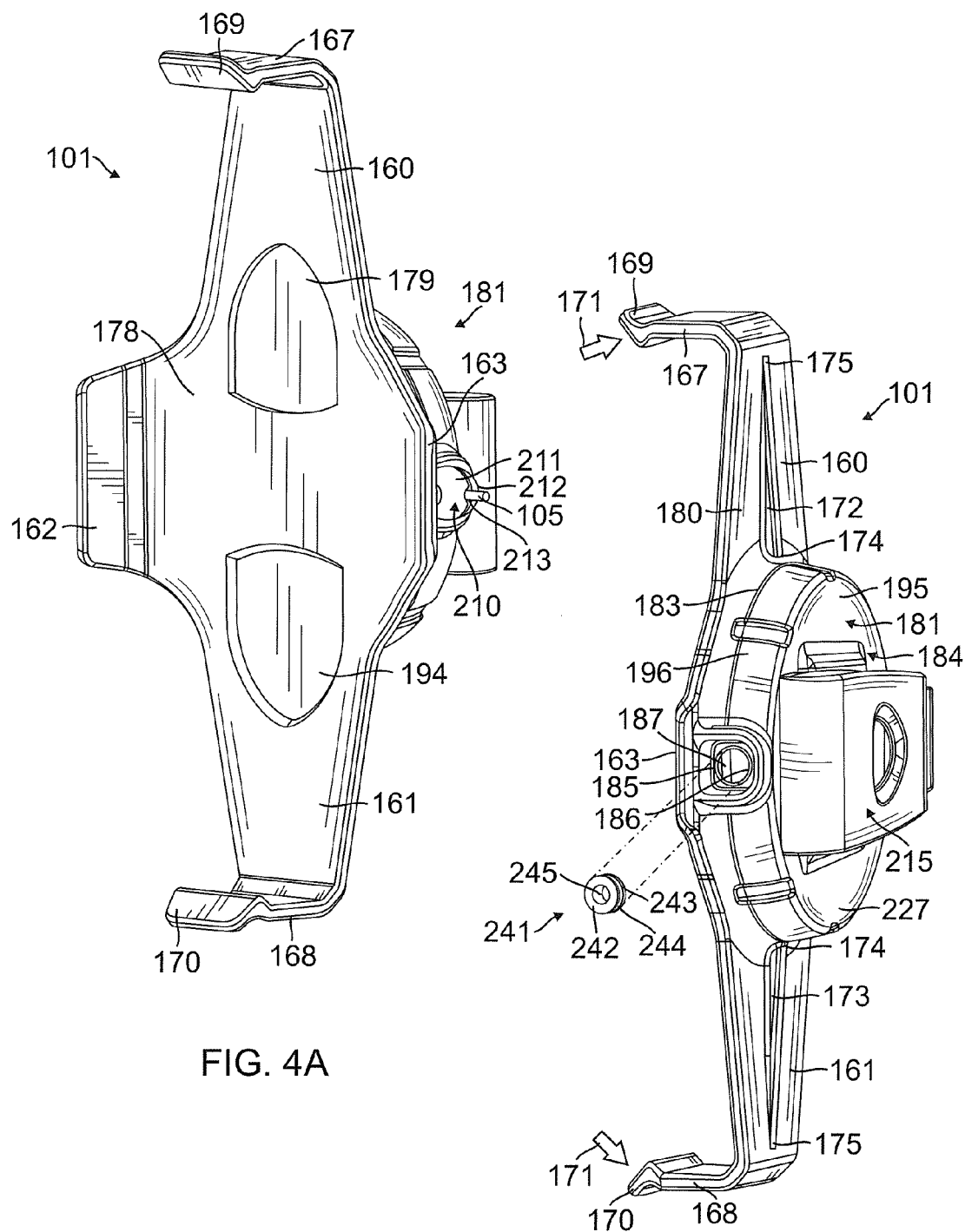
FIGS. 4A and 4B are front and rear perspective views, respectively, of a holster according to an embodiment of the present invention.

With reference now to the embodiment illustrated in FIGS. 4A and 4B, the holster 101 is configured to detachably secure the case 103 and the phone 104 housed therein to the user's person, such as the user's belt or strap 102 (see FIG. 1A). In the illustrated embodiment of FIGS. 4A and 4B, the holster 101 includes opposing arms 160, 161 extending from opposite ends of the holster 101 and opposing fingers 162, 163 extending from opposite sides of the holster 101. When the case 103 is attached to the holster 101, the arms 160, 161 are configured to engage the upper and lower walls 109, 110 of the case 103, and the fingers 162, 163 are configured to engage a portion of the lateral sidewalls 111, 112 of the case 103, as illustrated in FIGS. 2A and 2B. It will be appreciated that the fingers 162, 163 are configured to laterally support the case 103 and phone 104 in the holster 101 and the arms 160, 161 are configured to longitudinally support the case 103 and phone 104 in the holster 101.

With reference now to FIGS. 3A and 3B, the upper housing 106 includes a depression 165 in the upper wall 109 which is aligned with a depression 166 in the lower wall 110 of the lower housing 107. The depressions 165, 166 are configured to receive the upper and lower arms 160, 161 of the holster 101, respectively (see FIGS. 4A and 4B). The depressions 165, 166 in the upper and lower housings 106, 107 are configured to ensure proper lateral alignment between the case 103 and the holster 101 when the case 103 is attached to the holster 101, as illustrated in FIGS. 2A and 2B. Moreover, the depressions 165, 166 in the upper and lower housings 106, 107 are configured such that the case 103 "snaps" into the holster 101 to provide an auditory and tactile indication to the user that the case 103 is properly aligned and secured to the holster 101.

With reference again to the embodiment illustrated in FIGS. 4A and 4B, free ends of the arms 160, 161 include flanges 167, 168, respectively, extending orthogonally therefrom. The flanges are configured to overhang the upper and lower wall portions 109, 110 of the case 103 (see FIGS. 2A and 2B). Both of the arms 160, 161 also include a lip 169, 170 extending outward from the free ends of the flanges 167, 168. The lips 169, 170 are configured to enable the user to deflect the arms 160, 161 outward and thereby attach and detach the case 103 from the holster 101. When the user presses (arrow 171) against one of the lips 169, 170, the corresponding flange 167, 168 elastically deflects outward, which enables the user to slide the case 103 into and out of the holster 101. Additionally, in the illustrated embodiment of FIG. 4B, rear surfaces of the arms 160, 161 include gussets 172, 173 extending along a portion of the arms 160, 161. The gussets 172, 173 are configured to add flexural strength to the arms 160, 161 to accommodate the load applied when the user deflects the arms 160, 161 outward to attach and detach the case 103 to the holster 101. In the illustrated embodiment, the gussets 172, 173 taper between a relatively thicker portion 174 near the inner portion of the arms 160, 161 and a relatively thinner portion 175 near an outer portion of the arms 160, 161.

With continued reference to FIGS. 4A and 4B, the fingers 162, 163 are configured to extend only partially along the lateral sidewalls 111, 112 of the case 103 (see FIGS. 2A and 2B) when the case 103 is attached to the holster 101. Additionally, the holster 101 includes a relatively shorter finger 163 and a relatively longer finger 162. The shorter finger 163 is configured to support a portion of one of the sidewalls 111, 112 while still enabling the user to attach the case 103 to the holster 101. As illustrated in FIGS. 1A and 1B, when the phone retractor device 100 is attached to the user's belt or strap 102, the shorter finger 163 is oriented facing upward and the longer finger 162 is oriented facing downward. Accordingly, it will be appreciated that orienting the shorter finger 163 facing upward permits the user to conveniently insert the case 103 down into the holster 101, and orienting the longer finger 162 facing downward tends to prevent the case 103 from inadvertently falling out of the bottom of the holster 101. It will be appreciated, however, that the present invention is not limited to the relative sizes of the fingers 162, 163 described above, and the holster 101 may be provided with a variety of differently shaped and sized fingers, such as fingers having the same general shape and size, and still fall within the scope and spirit of the present invention. In an alternate embodiment, the holster 101 may be provided without the fingers.

With continued reference to FIG. 4A, an inner surface 178 of the holster includes one or more depressions. In the illustrated embodiment, the holster includes two depressions 179, 194 symmetric about an axis transverse to the lengthwise direction of the arms 160, 161. The depressions 179, 194 in the inner surface 178 of the holster 101 are configured to receive the locking mechanism 120 (i.e., latch 122 and catch 121 in FIG. 3B) on the case 103 when the case 103 is attached to the holster 101 such that the rear surface of the case 103 can sit flush against the inner surface 178 of the holster 101. In the illustrated embodiment, the depressions 179, 194 have the same generally triangular shape as the locking mechanism 120 on the case 103, but the depressions 179, 194 are slightly larger than the locking mechanism 120. It will be appreciated that the locking mechanism 120 of the case 103 is received in either one of the depressions 179, 194 depending upon the side of the user's body on which the phone retractor device 100 is attached and the orientation of the case 103 within the holster 101, as described above. Specifically, when the phone retractor device 100 is attached to the right-hand side of the user's belt 102, as illustrated in FIGS. 1A and 1B, the locking mechanism 120 on the case 103 is configured to be received in the upper depression 179, and when the phone retractor device 100 is attached to the left-hand side of the user's belt 102, the locking mechanism 120 is configured to be received in the lower depression 194.

With reference now to FIG. 4B, a rear surface 180 of the holster 101 includes a housing 181 configured to house a retractable reel assembly 182, described in detail below with reference to FIG. 5. The housing 181 comprises a circular flange 183 projecting rearward from the rear surface 180 of the holster 101 and a rear shell 184 cooperating with the circular flange 183. The rear shell 184 includes a circular disk 195 having an outer surface 227 and an annular flange 196 around the periphery of the disk 195 extending inward from the outer surface 227. The diameter of the annular flange 196 on the rear shell 184 is substantially equal to the diameter of the circular flange 183. Together, the circular flange 183 and the rear shell 184 form an interior cavity configured to house the retractable reel assembly 182. Additionally, both the circular flange 183 and the rear shell 184 include an arcuate notch 185, 186, respectively. The arcuate notch 185 in the circular flange 183 is configured to align with the arcuate notch 186 in the rear shell 184 when the rear shell 184 is attached to the circular flange 183. The rear shell 184 may be connected to the circular flange 183 by any suitable means, such as bonding, fastening, or welding (e.g., ultrasonic welding or friction stir welding). Together, the arcuate notches 185, 186 form an aperture 187 (e.g., a circular hole) in the housing 181 such that the tether 105 can extend from the interior cavity of the housing 181 and connect to the quick-release connector 137 (see FIGS. 2A and 2B). In one embodiment, the shell 184 may include two pins 190, 191 (see FIG. 6D) on either side of the arcuate notch 186 which are configured to be inserted into two corresponding openings 192, 193 (see FIG. 5) on opposite sides of the arcuate notch 185 in the circular flange 183. The pins 190, 191 and the openings 192, 193 are configured to ensure proper alignment between the shell 184 and the circular flange 183 such that the arcuate notches 185, 186 cooperate to define the aperture 187 in the housing 181. In one embodiment, a grommet 241 may be provided in the aperture 187. The grommet 241 is configured to prevent the tether 105 from chafing against the arcuate notches 185, 186 when the tether 105 is extended from and retracted into the housing 181. Otherwise, such chaffing may prematurely wear down the tether 105. In the illustrated embodiment, the grommet 241 includes two annular flanges 242, 243 spaced apart by an annular groove or channel 244. The annular channel 244 is configured to receive the arcuate notches 185, 186 when the grommet 232 is installed in the aperture 187. It will be appreciated that the diameter of the annular channel 244 is substantially equal to the diameter of the aperture 187 in the housing 181 and the diameter of the annular flanges 242, 243 of the grommet 241 is larger than the diameter of the aperture 187 to retain the grommet 241 in the aperture 187. Additionally, the grommet 241 includes an opening 245 (e.g., a circular hole) configured to permit the tether 105 to pass through the grommet 241. The grommet 241 may be formed of any suitably durable and elastomeric material, such as rubber.

Figure 5:
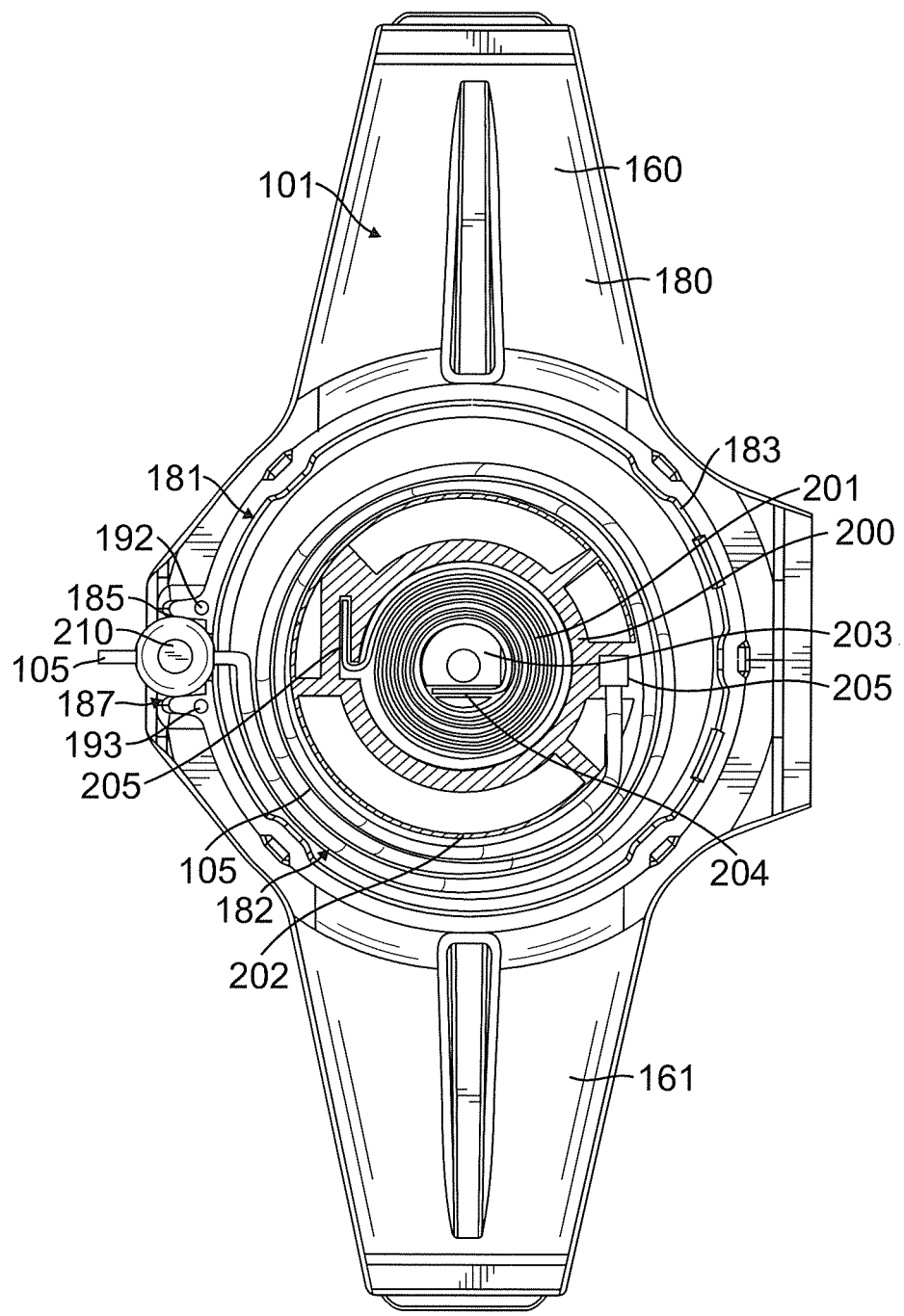
FIG. 5 is a cross-sectional view of a retractable reel assembly according to an embodiment of the present invention.

With reference to now to the embodiment illustrated in FIG. 5, the retractable reel assembly 182 comprises a reel 200, a spring 201 (e.g., a clock spring or a constant-tension coil spring), and the retractable tether 105. FIG. 5 is a cross-sectional view through the holster 101 revealing the components housed in the interior cavity of the housing 181. In the illustrated embodiment, a portion of the retractable tether 105 is wound around a circumferential channel or groove 202 in an outer surface of the reel 200 and a portion of the tether 105 extends out of the interior cavity through the aperture 187 in the housing 181. Additionally, a proximal end of the retractable tether 105 is connected to the reel 200 and a distal end of tether 105 is configured to attach to the quick-release connector 137, as described above. The reel 200 is rotatably mounted on an axle 203 projecting into the interior cavity of the housing 181 from the rear shell 184 (best shown in FIG. 6D). In an alternate embodiment, the axle may extend from the rear surface 180 of the holster 101 (e.g., the axle may be centrally disposed within the circular flange 183 on the rear surface 180 of the holster 101). Additionally, the spring 201 is disposed between reel 200 and the axle 203 and is fixedly connected at opposite ends to the axle 203 and the reel 200, respectively. The reel 200 includes a notch 205 configured to receive one end of the spring 201, and the axle 203 includes a narrow slit 204 configured to receive the opposite end of the spring 201. As described in detail below, the spring 201 is configured to supply a biasing force urging retraction of the tether 105 into the interior cavity of the housing 181.

In use, the tether 105 is configured to move between a retracted position when the case 103 and phone 104 are attached to the holster 101 (see FIG. 1A) and an extended position when the case 103 and phone 104 are detached from the holster 101 and raised toward the user's face (see FIG. 1B). When the distal end of the tether 105 is pulled with sufficient force to overcome the biasing force of the spring 201, the tether 105 unwinds from the reel 200 and extends out of the interior cavity through the aperture 187 in the housing 181. As the tether 105 is extended out from the housing 181, the reel 200 rotates and thereby winds the coil spring 201. The wound spring 201 is configured to provide a force biasing the reel 200 to rewind the tether 105 onto the reel 200 (i.e., the wound spring 201 urges retraction of the tether 105 into the housing 181 of the holster 101). When the distal end of the tether 105 is released, such as when the user reattaches the case 103 and phone 104 to the holster 101, the tether 105 rewinds into the retracted position on the reel 200 under the biasing force of the spring 201. In this manner, the retractable reel mechanism 182 is configured to tether the case 103 and phone 104 to the holster 101 even as the user detaches the phone 104 from the holster 101 and raises the phone 104 to his or her face. Additionally, the retractable reel mechanism 182 is configured to urge retraction of the phone 104 into the holster 101 when the user releases the case 103, such as by attaching the case 103 to the holster 101 or inadvertently dropping the phone 104. A suitable retractable reel mechanism 182 is described in U.S. Patent Publication No. 2011-0174852-A1, which is hereby incorporated by reference in its entirety. The tether 105 can be made of any suitable material, for example, chain, Kevlar cord, cable, or monofilament, that provides sufficient strength to tether a phone and sufficient flexibility to wind on the reel.

With continued reference to the embodiment illustrated in FIG. 5, the retractable reel assembly 182 also includes a stop 210 connected to the tether 105. The stop 210 is positioned along the tether 105 at a length L (see FIG. 2B) from the distal end of the tether 105. The stop 210 is larger than the aperture 187 in the housing 181 such that the stop 210 is configured to prevent a portion of the tether 105 from retracting into the interior cavity of the housing 181 (i.e., the stop 210 is configured to prevent the portion of the tether 105 between the distal end of the tether 105 and the stop 210 from retracting into the housing 181). In one embodiment, the stop 210 is formed from opposing halves 211, 212 (see FIG. 4A). The opposing halves 211, 212 of the stop 210 may be connected by any suitable means, such as bonding, fastening, crimping, or welding (e.g., ultrasonic welding or friction stir welding). The stop 210 also includes an opening 213 (FIG. 4A) configured to receive the tether 105. Additionally, the stop 210 may also include friction-inducing features, such as ridges or grooves projecting inward into the opening 213, configured to prevent the stop 210 from sliding along the tether 105 (i.e., the opening 213 in the stop 210 may include ridges or grooves configured to engage the tether 105). In another embodiment, the stop 210 may be bonded to the tether 105, such as with epoxy. In one embodiment, the stop 210 is positioned along the tether 105 at length L from the distal end of the tether 105 such that the portion of the tether 105 between the stop 210 and the quick-release connector 137 is not taut when the case 103 is attached to the holster 101 (i.e., the stop 210 may be positioned along the tether 105 such that the portion of the tether 105 configured not to retract into the housing 181 is slightly loose when the case 103 is attached to the holster 101, as illustrated in FIG. 1A). Otherwise, a taut tether 105 may chafe against the case 103 or the holster 101, which could prematurely wear the tether 105.

Figure 6A:
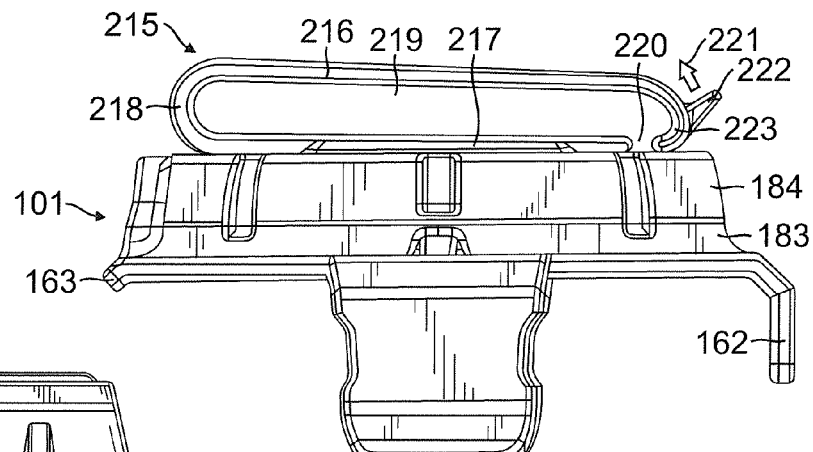
FIGS. 6A and 6B are a side view and back view, respectively, of a belt clip according to an embodiment of the present invention.
Figure 6B:
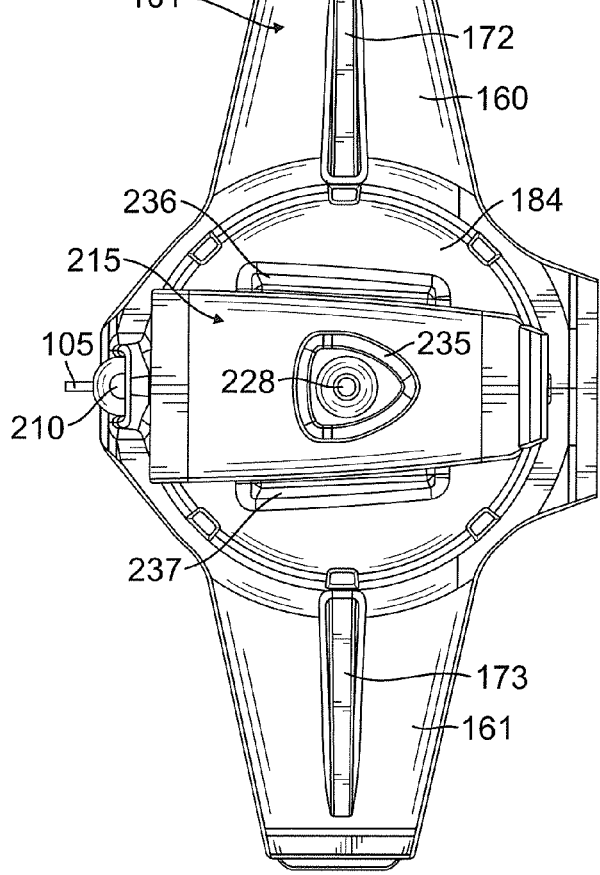

With reference now to the embodiment in FIGS. 6A and 6B, the phone retractor device 100 includes a clip 215 configured to detachably connect the holster 101 to the user's person, such as a belt, strap, or waistband 102 (FIG. 1A) worn by the user. In the illustrated embodiment, the U-shaped belt clip 215 includes a longer outer leg 216 and a shorter inner leg 217 joined at one end by a rounded portion 218. The legs 216, 217 define a cavity 219 therebetween for receiving the belt, strap, or waistband 102. Additionally, the ends of the legs 216, 217 opposite the rounded portion 218 are separated by a gap 220. In the illustrated embodiment, the free end of the longer outer leg 216 includes a rounded return flange portion 223 extending toward the shorter inner leg 217, and a lip portion 222 extending outward from the return flange portion 223 of the outer leg 216. It will be appreciated that the clip 215 can be hooked onto a belt 102 already worn by the user or alternately placed on the belt 102 before the user dons the belt 102. In the latter instance, the belt 102 may simply be inserted through the cavity 219 defined between the legs 216, 217. In the formed instance, the longer leg 216 of the clip 215 is configured to be elastically deformed away from the shorter leg 217. As illustrated in FIG. 6A, the user may press (arrow 221) the lip portion 222 of the longer leg 216 away from the shorter leg 217 to increase the gap 220 between the legs 216, 217. With the gap 220 expanded, the user can insert the belt or strap 102 through the expanded gap 220 and into the cavity 219. After the belt or strap 102 is inserted into the cavity 219, the user may release the lip 222 which causes the longer leg 216 to return to its original neutral state. In the neutral state, the return flange portion 223 of the longer leg 216 is configured to prevent the clip 215 from inadvertently disengaging the belt or strap 102. To remove the holster 101 from the belt or strap 102, the aforementioned steps are performed in reverse.

For mounting the clip 215 to the holster 101, the clip 215 includes a reversed keyway configured to extend into the rear shell 184. In the illustrated embodiment of FIGS. 6C and 6D, the reversed keyway comprises a generally cuboid protrusion 225 extending down from the shorter inner leg 217 of the clip 215. The cuboid protrusion 225 is configured to be received in a generally square recess 226 in the outer surface 227 of the shell 184. When the cuboid protrusion 225 on the clip 215 is seated in the square recess 226 in the shell 184, the clip 215 is prevented from rotating relative to the holster 101. The shorter leg 217 also includes an opening 228, such as a through hole, centrally disposed on the cuboid protrusion 225 for receiving a fastener (e.g., a button head screw) securing the clip 215 to the holster 101. The opening 228 in the shorter leg 217 is configured to align with an axial opening 229 in the axle 203 on the rear shell 184. The axial opening 229 is centrally disposed within the square recess 226 in the outer surface 227 of the shell 184 and extends down along the axial length of the axle 203. In one embodiment, the axial opening 229 may be a smooth bore configured to receive a self-threading fastener. In an alternate embodiment, the axial opening 229 may be internally threaded or may include a helical insert (not shown). When the fastener (not shown) is installed, a head portion of the fastener abuts an upper surface 230 of the shorter leg 217, and a shaft portion of the fastener extends through the opening 228 in the shorter leg 217 and into the axial opening 229 in the axle 203, thereby securing the clip 215 to the holster 101.

Figure 6C:
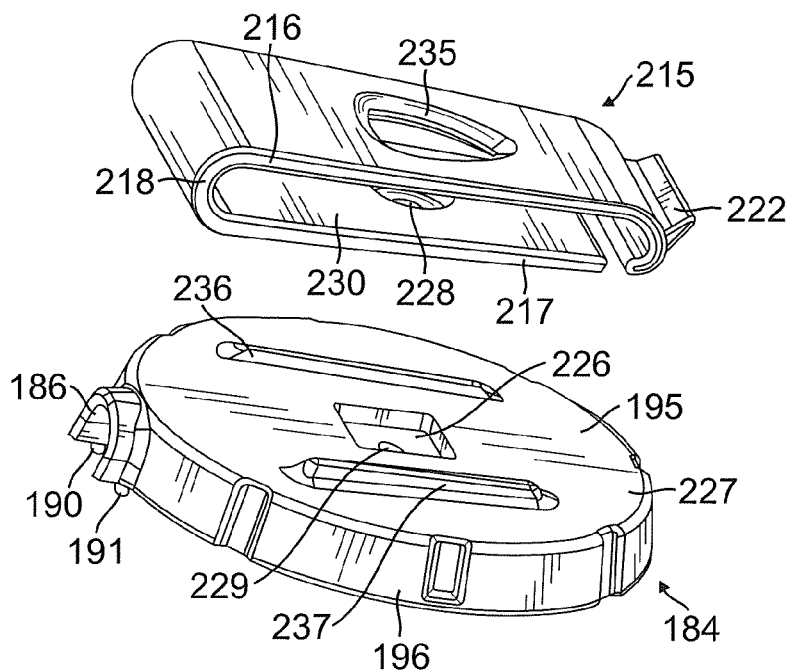
FIGS. 6C and 6D are exploded views of a belt clip and a rear shell according to an embodiment of the present invention.
Figure 6D:
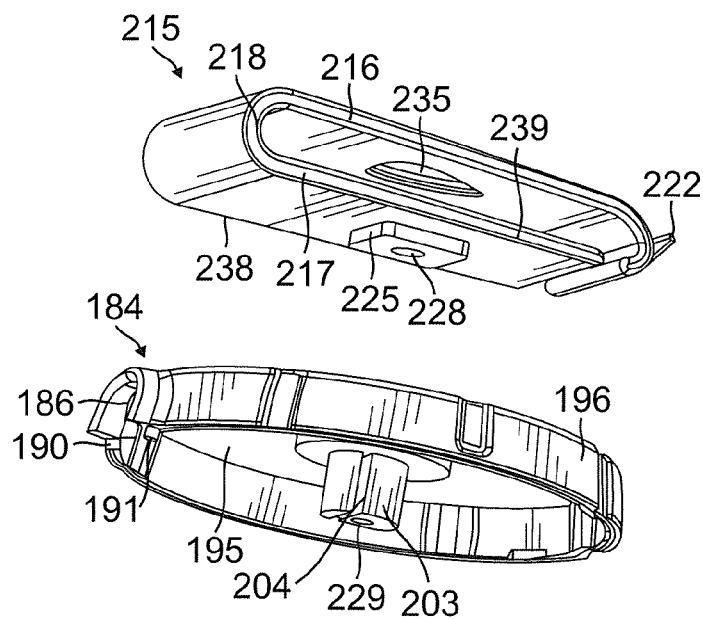

With continued reference to FIGS. 6B-6D, the longer leg 216 of the clip 215 also includes an opening 235 generally aligned with the opening 228 in the shorter leg 217. The opening 228 in the longer leg 216 facilitates installation of the fastener securing the belt clip 215 to the holster 101 with either hand tools or power tools. In one embodiment, the opening 235 is sized such that the fastener (not shown) may be inserted through the opening 235 in the longer leg 216 and a portion of the installation tool (e.g., screwdriver or power drill) may extend through the opening 235 to engage and install the fastener. Additionally, the outer surface 227 of the shell 184 includes two opposing ridges 236, 237 configured to abut opposing edges 238, 239, respectively, of the lower leg 217 of the clip 215. The ridges 236, 237 are configured to ensure proper alignment between the clip 215 and the holster 101 when the clip 215 is attached to the holster 101. Moreover, it will be apparent to a person of ordinary skill in the art that the lengthwise direction of the belt clip 215 is oriented orthogonally to the lengthwise direction of the holster 101 such that the phone 104 will be oriented horizontally when the phone retractor device 100 is attached to the user's belt 102, as illustrated in FIG. 1A.

The case 103, holster 101, and belt clip 215 may comprise any suitably strong and durable material, such as acetal plastic, nitinol, aluminum alloy, polyvinyl chloride (PVC), or carbon fiber-reinforced plastic. The case 103, holster 101, and belt clip 215 may be formed from any suitable process, such as machining, injection molding, stamping, die cutting, or rapid prototyping using additive manufacturing (e.g., laser sintering or stereolithography).

In use, the user may secure the case 103 to the phone 104 by detaching and separating the upper and lower housings 106, 107 from each other, inserting the phone 104 into the cavity 113 of the case 103, and then reconnecting the upper and lower housings 106, 107. The user may then secure the holster 101 to an article worn by the user, such as a belt 102, by attaching the belt clip 215 on the rear surface of the holster 101 to the belt 102. As described above, the holster 101 may be attached to either the left or right side of the user's belt 102. The user may then tether the case 103 and the phone 104 housed therein to the holster 101 by selectively inserting the quick-release connector 137, which is attached to the distal end of the tether 105, into the appropriate receptacle 131, 132 on the case 103, depending upon the considerations described above. When the phone 104 is not in use, the user may attach the case 103 and phone 104 to the holster 101 such that the arms 160, 161 and fingers 162, 163 of the holster 101 engage the upper and lower wall portions 109, 110 and opposing lateral wall portions 111, 112, respectively, of the case 103. To use the phone 104, the user may detach the phone 104 and case 103 from the holster 101 by deflecting one of the arms 160, 161 of the holster 101 away from the case 103 and drawing the case 103 out of engagement with the holster 101. When the phone 104 is drawn up to the user's ear, the tether 105 extends further out of the housing 181 in the holster 101 to maintain the tethered connection between the phone 104 and the holster 101. When the case 103 and phone 104 are reattached to the holster 101, the tether 105 rewinds into the housing 181 under the biasing force of the spring 201. Additionally, the user may detach the quick-release connector 137 from the case 103 to permit the user to use the phone 104 independently of the holster 101 and tether 105.

Additionally, the user may use the holster 101 to prop the phone 104 in an inclined position, as illustrated in FIG. 7. Together, the lip portion 222 of the belt clip 215 and the longer finger 162 (see also FIG. 6A) of the holster 101 are configured to support the phone 104 in an inclined position on a relatively flat surface, such as a desk or table 240. Propping the phone 104 in an inclined position may facilitate various uses of the phone 104, such as viewing multimedia (e.g., pictures, movies) on the screen of the phone 104.

Figure 8:
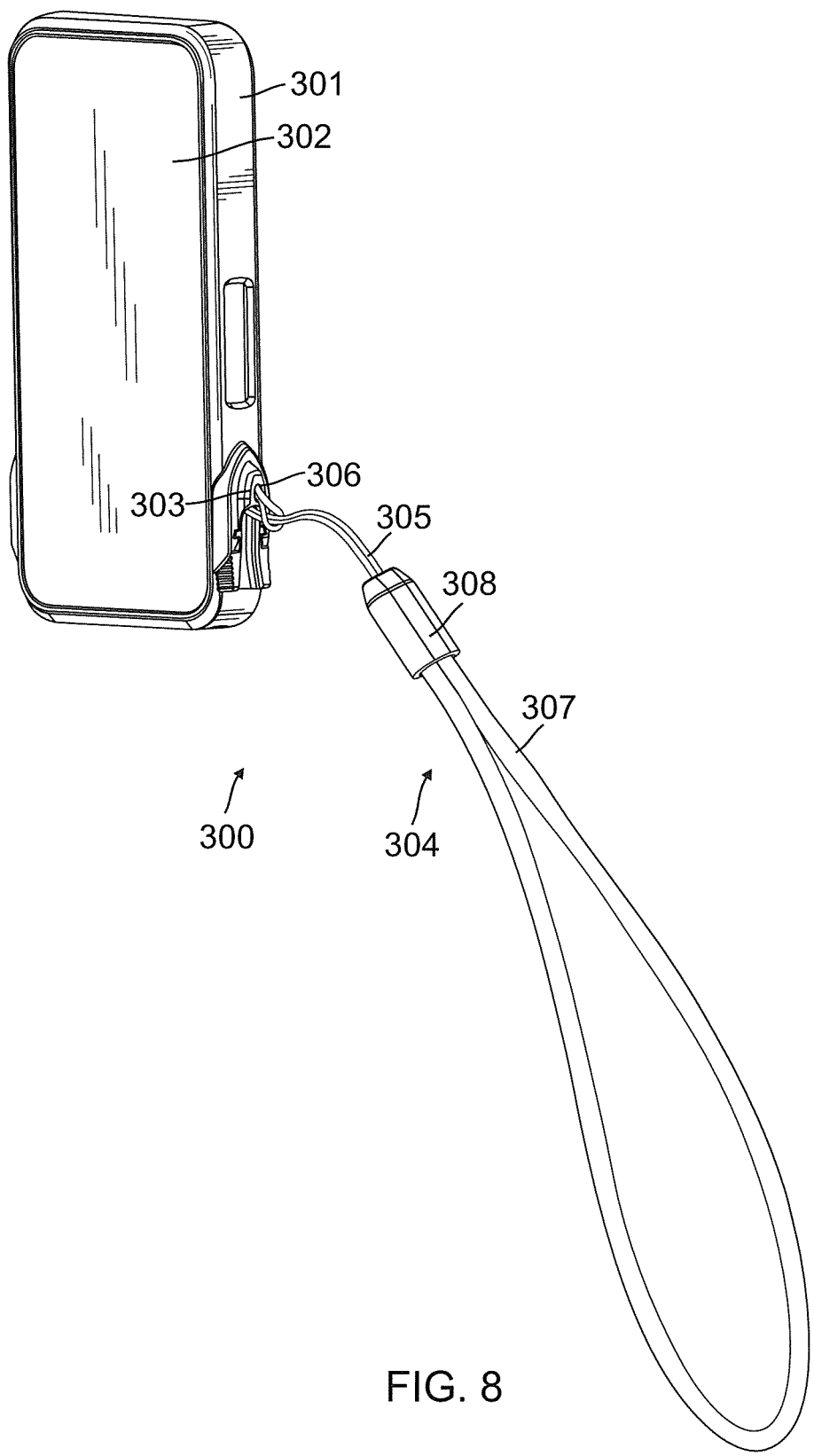
FIG. 8 is a perspective view of a phone device according to an embodiment of the present invention having a carrying case, a quick-release connector attached to the carrying case, and a wrist strap attached to the quick-release connector.
Figure 9:
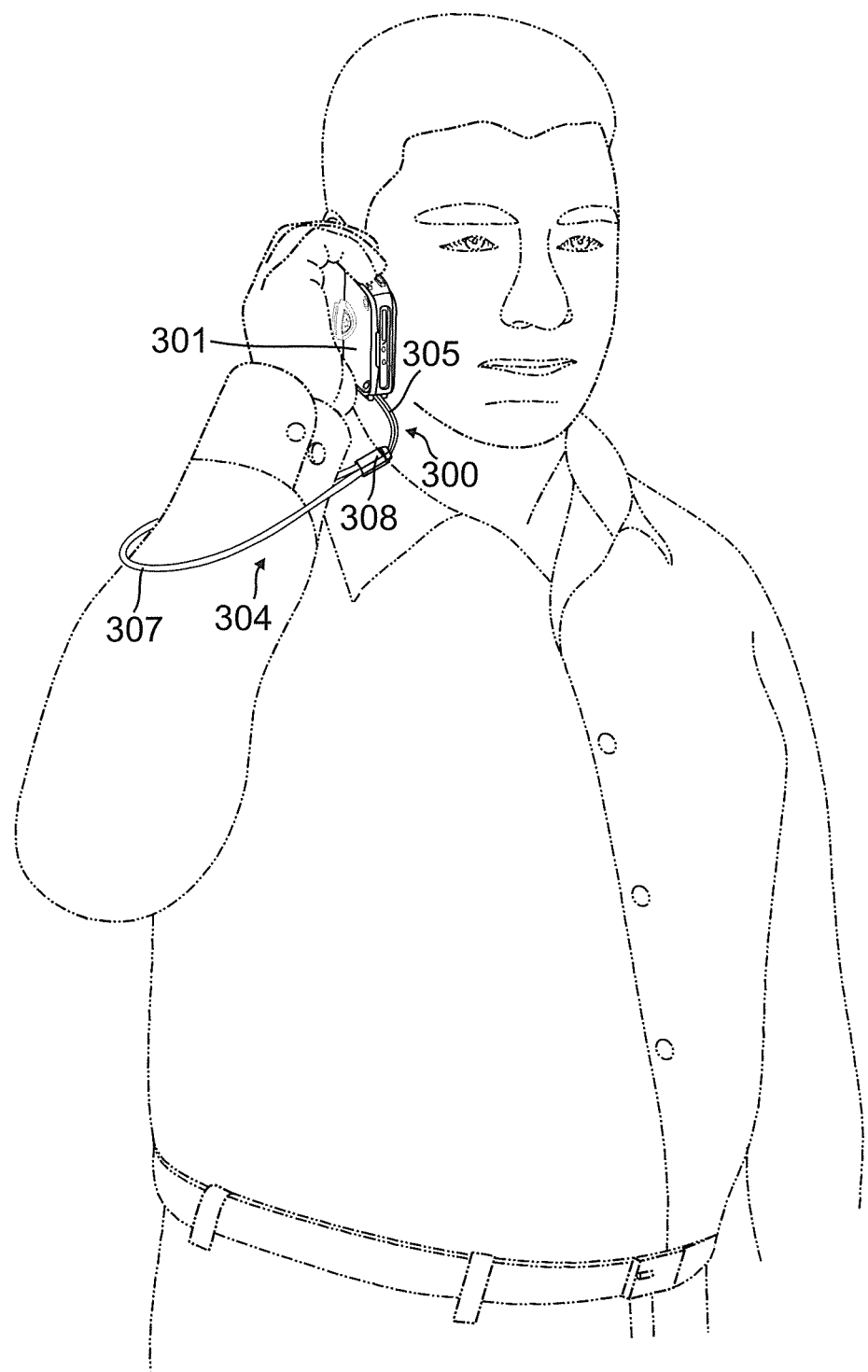
FIG. 9 is a perspective view of the phone device of FIG. 8 shown with the wrist strap around a user's wrist.

In an alternate embodiment illustrated in FIGS. 8 and 9, a phone device 300 may be provided without the holster 101. In the illustrated embodiment, the phone device 300 includes a carrying case 301 configured to receive a phone 302 and a quick-release connector 303 detachably connected to the carrying case 301, substantially as described above. Additionally, the phone device 300 includes a wrist strap 304 configured to secure the phone 302 and the carrying case 301 to the user's wrist. The wrist strap 304 is configured to prevent the phone 302 from contacting the ground if the user inadvertently drops the phone 302. Additionally, the user may detach the quick-release connector 303 from the case 301, as described above, to permit the user to use the phone 302 independently of the wrist strap 304. As illustrated in FIG. 9, the wrist strap 304 includes a cord 305 looped around an opening 306 in the quick-release connector 303 and a looped strap 307 attached to the cord 305. In an alternate embodiment, the cord 305 may be secured to the quick release connector 303 by any other suitable means, such as bonding, adhering, or fastening. The looped strap 307 forms an opening configured to receive the user's wrist, as shown in FIG. 9. Additionally, a connector 308 may be provided to attach the strap 307 to the cord 305. In an alternate embodiment, the strap 307 may be attached to the cord 305 without the connector 308, such as by bonding or adhering. In the illustrated embodiment, the diameter of the strap 307 is larger than the diameter of the cord 305, although any suitable combination of diameters is contemplated depending upon the desired strength and flexibility of the strap 307 and the cord 305. The strap 307 and the cord 305 may be made of any suitably flexible and durable material, such as rubber, nylon, or fabric. Additionally, the cord 305 and the strap 307 may be made of dissimilar materials. In one embodiment, the cord 305 is made of fabric and the strap 307 is made of an elastomeric material, such as rubber. The connector 308 may be made of any suitably durable material, such as rubber, plastic, or metal.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "distal, "proximal" and similar terms have been used herein to describe a spatial relationship of one element to another, it is understood that these terms are intended to encompass different orientations of the various elements and components of the device in addition to the orientation depicted in the figures. Moreover, the figures contained in this application are not necessarily drawn to scale.

What is claimed is:

1. An apparatus for securing a phone to an article on a person, comprising:
    a case configured to receive the phone;
    a holster configured to detachably receive the case;
    a retractable tether having a distal end and a proximal end opposite the distal end, the proximal end connected to the holster, and the distal end configured to be detachably coupled to the case, wherein a portion of the tether is housed in the holster, the tether configured to move between a retracted position and an extended position;
    a spring coupled to the tether, the spring configured to bias the tether into the retracted position;
    a quick-release connector attached to the distal end of the tether, the quick-release connector comprising two opposing compressible legs diverging from a common tapered head and a flange extending peripherally along at least a portion of each of the two opposing compressible legs and the common tapered head, wherein the common tapered head tapers from a narrower first end to a wider second end, and wherein the two opposing compressible legs extend from the wider second end of the common tapered head, wherein the distal end of the tether is connected to the quick-release connector by engaging a hole formed in the common tapered head;
    an open U-shaped channel defined between the two opposing compressible legs, wherein no material is present between the opposing compressible legs, the open U-shaped channel being concave at a junction between the two opposing compressible legs; and
    at least one receptacle on the case, the at least one receptacle defining a tapered channel for receiving at least a portion of the two opposing compressible legs and the common tapered head of the quick-release connector, and a groove to receive the flange of the quick-release connector.

2. The apparatus of claim 1, wherein the case comprises a first housing and a second housing slidably engageable with the first housing, the first and second housings cooperating to receive the phone.

3. The apparatus of claim 2, wherein one of the first and second housings includes a catch configured to engage a latch on the other housing.

4. The apparatus of claim 2, wherein one of the first and second housings includes a tongue configured to slidably engage a groove on the other housing.

5. The apparatus of claim 1, further comprising a clip connected to the holster, the clip configured to attach the apparatus to the article.

6. The apparatus of claim 5, wherein the clip further comprises a reversed keyway configured to be received in a recess in the holster.

7. The apparatus of claim 1, wherein the case further comprises first and second opposing receptacles for receiving the quick-release connector.

8. The apparatus of claim 1, wherein the quick-release connector further comprises teeth configured to detachably engage notches in the receptacle.

9. The apparatus of claim 1, further comprising a stop connected to the tether at a first length from the distal end of the tether such that the first length of the tether is slack when the case is attached to the holster.

10. The apparatus of claim 1, further comprising a spool rotatably housed within the holster, and wherein a portion of the tether is wound around the spool.

11. The apparatus of claim 1, wherein the holster further comprises opposing first and second arms extending in a first direction, the arms configured to engage a portion of the case.

12. The apparatus of claim 11, wherein the holster further comprises opposing first and second fingers extending in a second direction, the fingers configured to laterally support the case.

13. The apparatus of claim 12, wherein the first direction is generally orthogonal to the second direction.

14. The apparatus of claim 13, wherein the case further comprises first and second depressions configured to receive the first and second arms, the depressions configured to provide auditory and tactile indication to the user that the case is properly aligned and secured to the holster.

15. The apparatus of claim 1, wherein the holster is configured to receive the case in a horizontal orientation when the holster is attached to the article.

16. The apparatus of claim 1, wherein the holster further comprises a circular flange, wherein the tether is rotatably disposed within the circular flange.

17. The apparatus of claim 16, further comprising a shell configured to connect to the circular flange, the shell and circular flange cooperating to define an interior cavity configured to house at least a portion of the tether and an aperture through which a portion of the tether extends.

18. The apparatus of claim 1, wherein the distal end of the tether is connected to the quick-release connector by a knot formed in the distal end of the tether engaging the hole formed in the common tapered head of the quick-release connector.

19. The apparatus of claim 1, wherein a rear surface of the case further comprises a plurality of feet configured to support the case on a level surface.

20. The apparatus of claim 1, wherein a first compressible leg and a second compressible leg of the two opposing compressible legs each include a free distal end and a proximal end at the common tapered head, and wherein the open U-shaped channel extends continuously from the proximal end of the first compressible leg to the proximal end of the second compressible leg.

21. An apparatus for securing a phone to a user's wrist, comprising:
    a case configured to receive the phone;
    a quick-release connector configured to be detachably connected to the case, the quick-release connector comprising two opposing compressible legs diverging from a common tapered head and a flange extending peripherally along at least a portion of each of the two opposing compressible legs and the common tapered head, wherein the common tapered head tapers from a narrower first end to a wider second end, and wherein the two opposing compressible legs extend from the wider second end of the common tapered head;

an open U-shaped channel defined between the two opposing compressible legs, wherein no material is present between the opposing compressible legs, the open U-shaped channel being concave at a junction between the two opposing compressible legs;

at least one receptacle on the case, the at least one receptacle defining a tapered channel for receiving at least a portion of the two opposing compressible legs and the common tapered head of the quick-release connector, and a groove to receive the flange of the quick-release connector; and a wrist strap connected to the quick-release connector, the wrist strap extending through an opening in the common tapered head.

22. The apparatus of claim 21, wherein the case comprises a first housing and a second housing slidably engageable with the first housing, the first and second housings cooperating to receive the phone.

\* \* \* \* \*